United States Patent [19]

Shu

[11] Patent Number: 5,645,265

[45] Date of Patent: Jul. 8, 1997

[54] FOLDABLE WIRE DRAW BENCH

[76] Inventor: Rui-Chi Shu, 108, Ba Feng Street, Jia Dong Li, Ba De City, Tao Yuan Shien, Taiwan

[21] Appl. No.: 588,736

[22] Filed: Jan. 19, 1996

[51] Int. Cl.[6] ........................................... E21C 29/16
[52] U.S. Cl. .................. 254/134.3 FT; 254/134.3 R; 254/134.3 SC; 254/4 R; 254/1
[58] Field of Search ........................ 254/134.3 FI, 254/134.3 SC, 134.3 R, 134.5, 4 R, 2 R, 1, 4 B, DIG. 11

[56] References Cited

U.S. PATENT DOCUMENTS

| | | | |
|---|---|---|---|
| 3,968,952 | 7/1976 | Newell | 254/134.3 R |
| 4,456,225 | 6/1984 | Lucas | 254/134.3 FT |
| 4,497,470 | 2/1985 | Carter et al. | 254/134.3 FT |
| 5,464,193 | 11/1995 | Wrate | 254/134.3 FT |

*Primary Examiner*—Timothy V. Eley
*Assistant Examiner*—Lee Wilson
*Attorney, Agent, or Firm*—Peterson Wicks Nemer & Kamrath

[57] ABSTRACT

A foldable wire draw bench comprises a main body, a retarding motor on the main body, a spool at the front end of the main body, the first section arm at the front upper portion of the main body, the second section arm and the third section arm. The first section arm and the second section arm are connected by the first positioning device. The third section arm and the second section arm are connected by the second positioning device. A wire-leading position device connects the distal end of the third section arm. Two legs are at the rear bottom end of the main body. A grip is at a rear end of the main body.

1 Claim, 15 Drawing Sheets

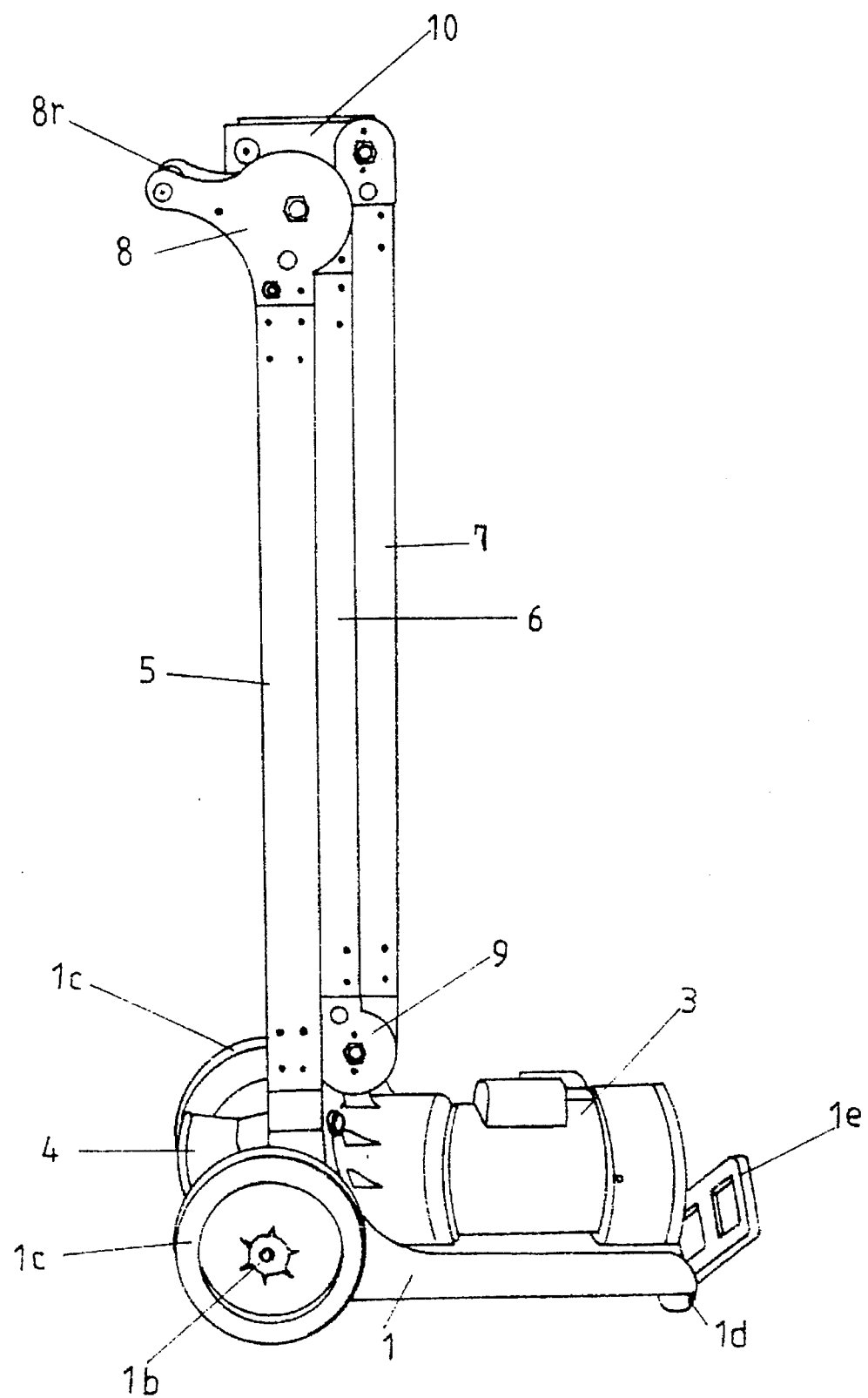
F I G. 1

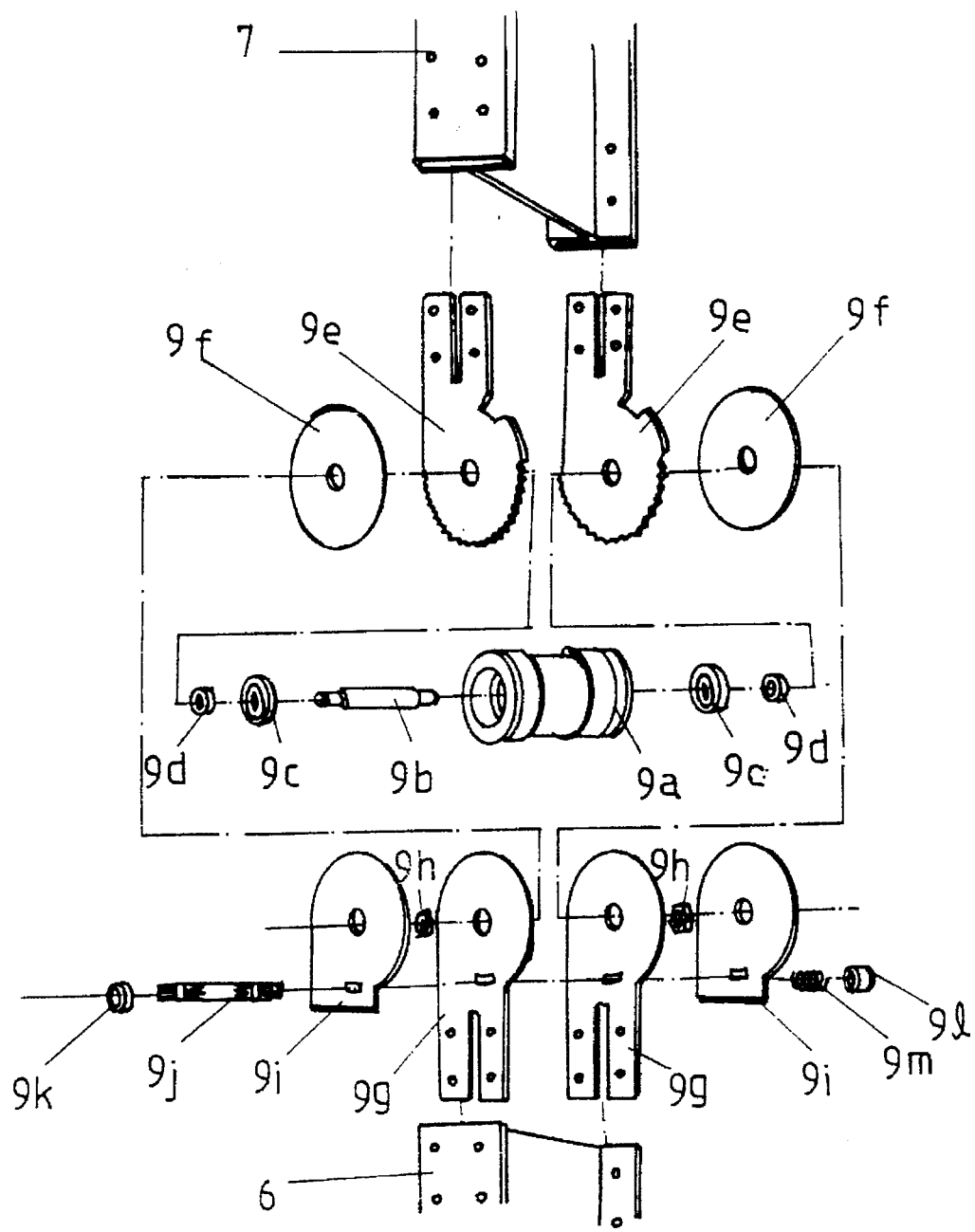
F I G. 8

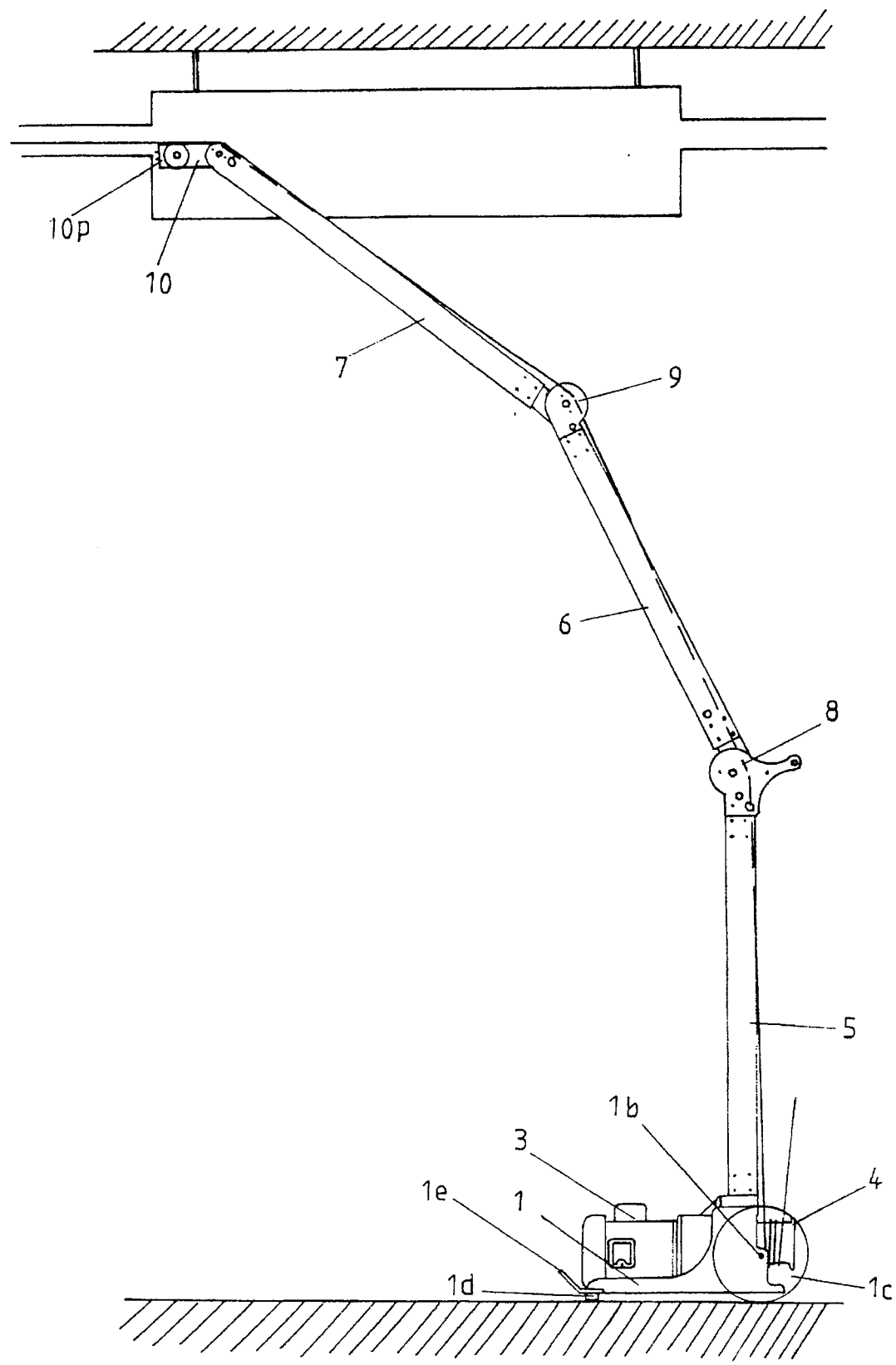
F I G. 12

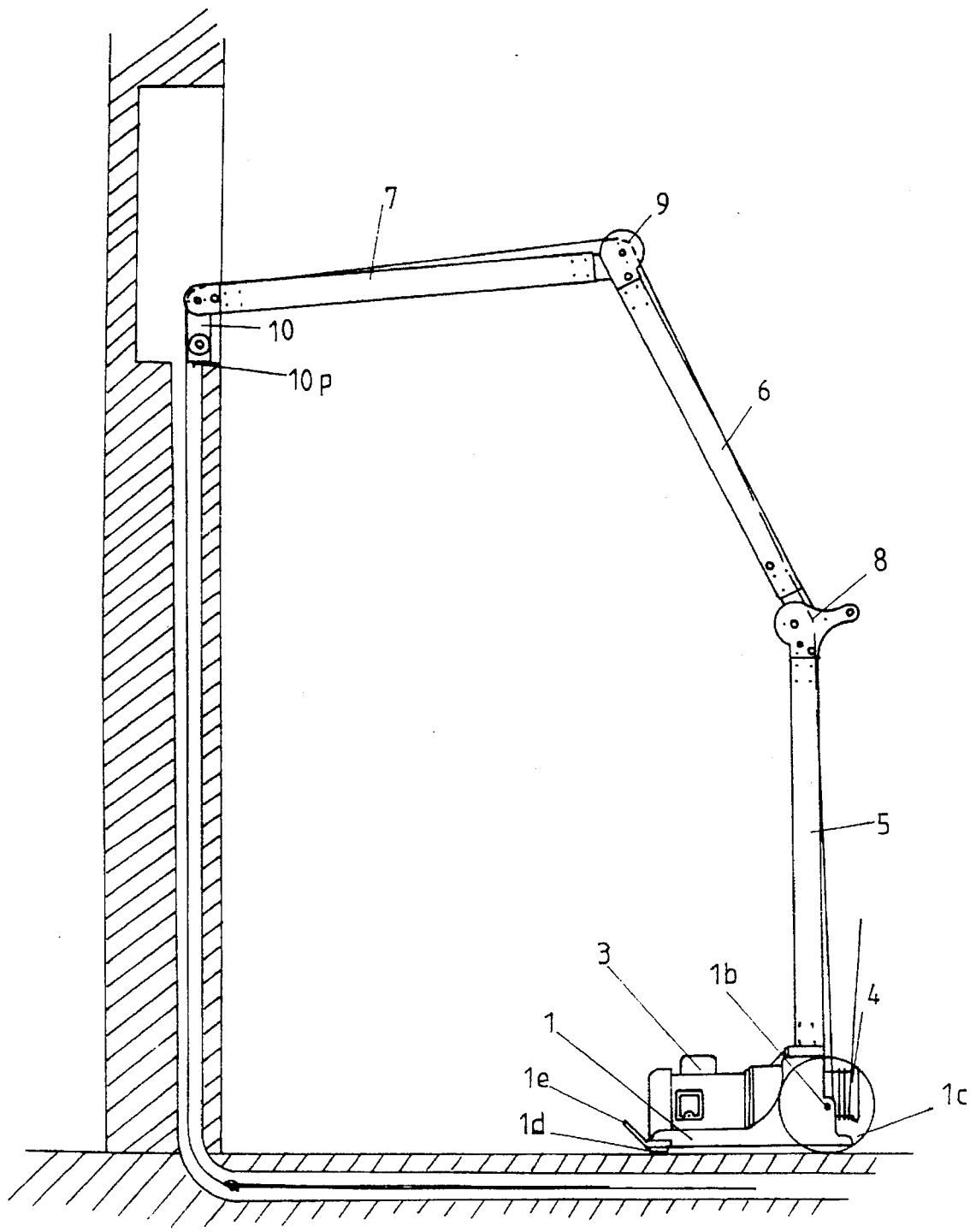
F I G. 14

FOLDABLE WIRE DRAW BENCH

BACKGROUND OF THE INVENTION

The invention relates to a wire tensioner. More particularly, the invention relates to a foldable wire draw bench for wiring engineering.

The conventional wiring engineer has to bind one end of wires or cables with a soft steel leader at one end of a pipe. The soft steel leader and the wire are pulled out at the other end of the pipe. Most wire draw benches are very heavy so that they cannot be removed by a single person. They do not have an automatic clutch, so the steel leader wiring has to be operated manipulatively.

SUMMARY OF THE INVENTION

An object of the invention is to provide a foldable wire draw bench which can be positioned, adjusted and removed quickly.

Another object of the invention is to provide a foldable wire draw bench which can be stored vertically.

Another object of the invention is to provide a foldable wire draw bench in order to adjust the angle between two section arms up to one hundred and eighty degrees.

Accordingly, a foldable wire draw bench comprises a main body, a retarding motor disposed on the main body, a spool disposed at the front end of the main body, the first section arm disposed at the front upper portion of the main body, the second section arm and the third section arm. The first section arm and the second section arm are connected by the first non-push type positioning device. The third section arm and the second section arm are connected by the second non-push type positioning device. A wire-leading position device connects the distal end of the third section arm. Two legs are disposed at the rear bottom end of the main body. A grip is disposed at a rear end of the main body.

BRIEF DESCRIPTION OF THE DRAWINGS

FIG. 1 is a perspective assembly view of a foldable wire draw bench of a preferred embodiment in accordance with the invention;

FIG. 8 is a perspective exploded view of the second non-push type positioning device;

FIG. 12 is a schematic view illustrating the drawing of an exposed pipe disposed on the ceiling with a foldable wire draw bench;

FIG. 14 is a schematic view illustrating the drawing of a pipe whose end is upward in a wall with a foldable wire draw bench.

DETAILED DESCRIPTION OF THE INVENTION

Figure 2:
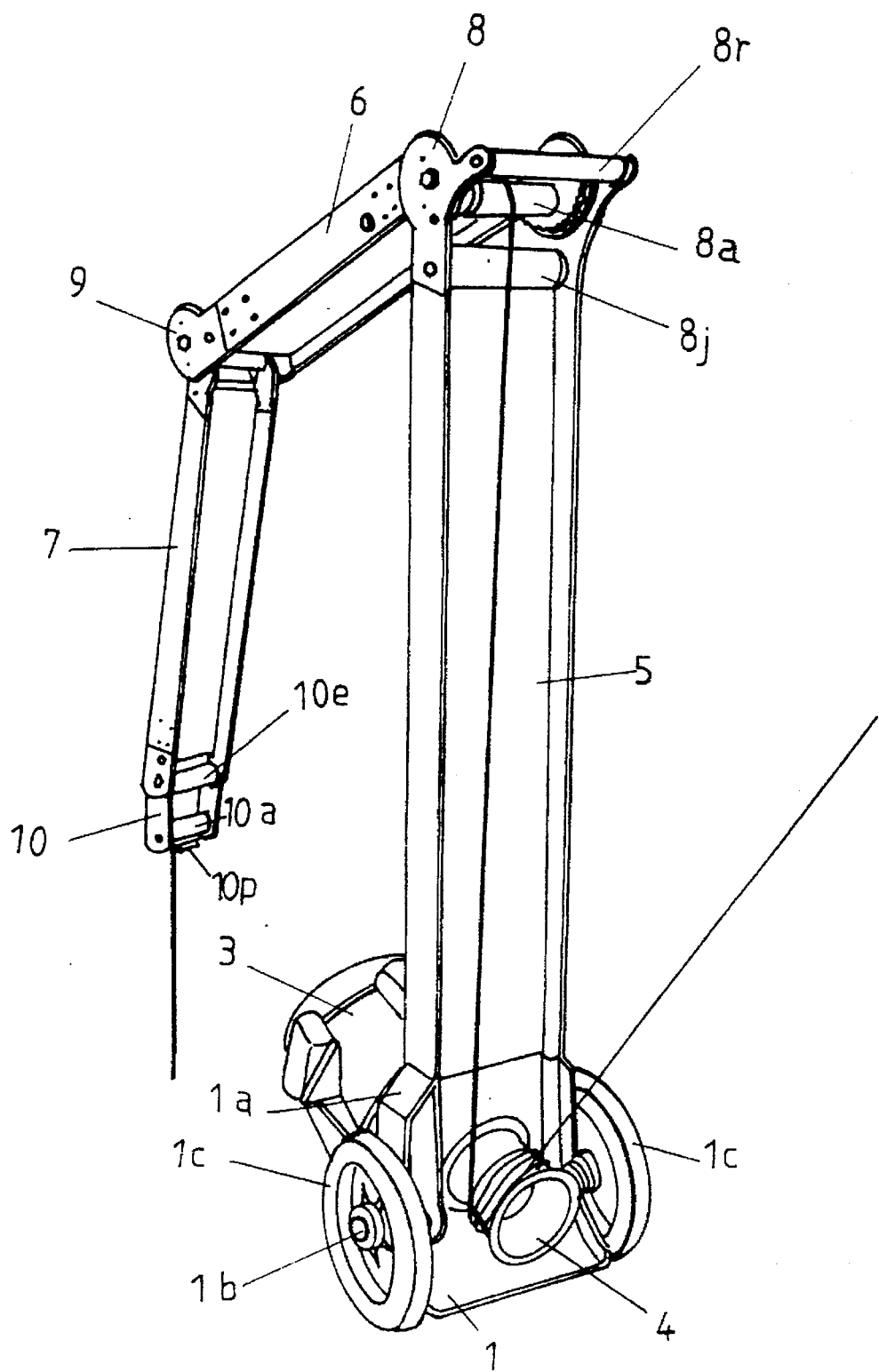
FIG. 2 is a perspective assembly view of a foldable wire draw bench while the third section arm is expanded.
Figure 3:
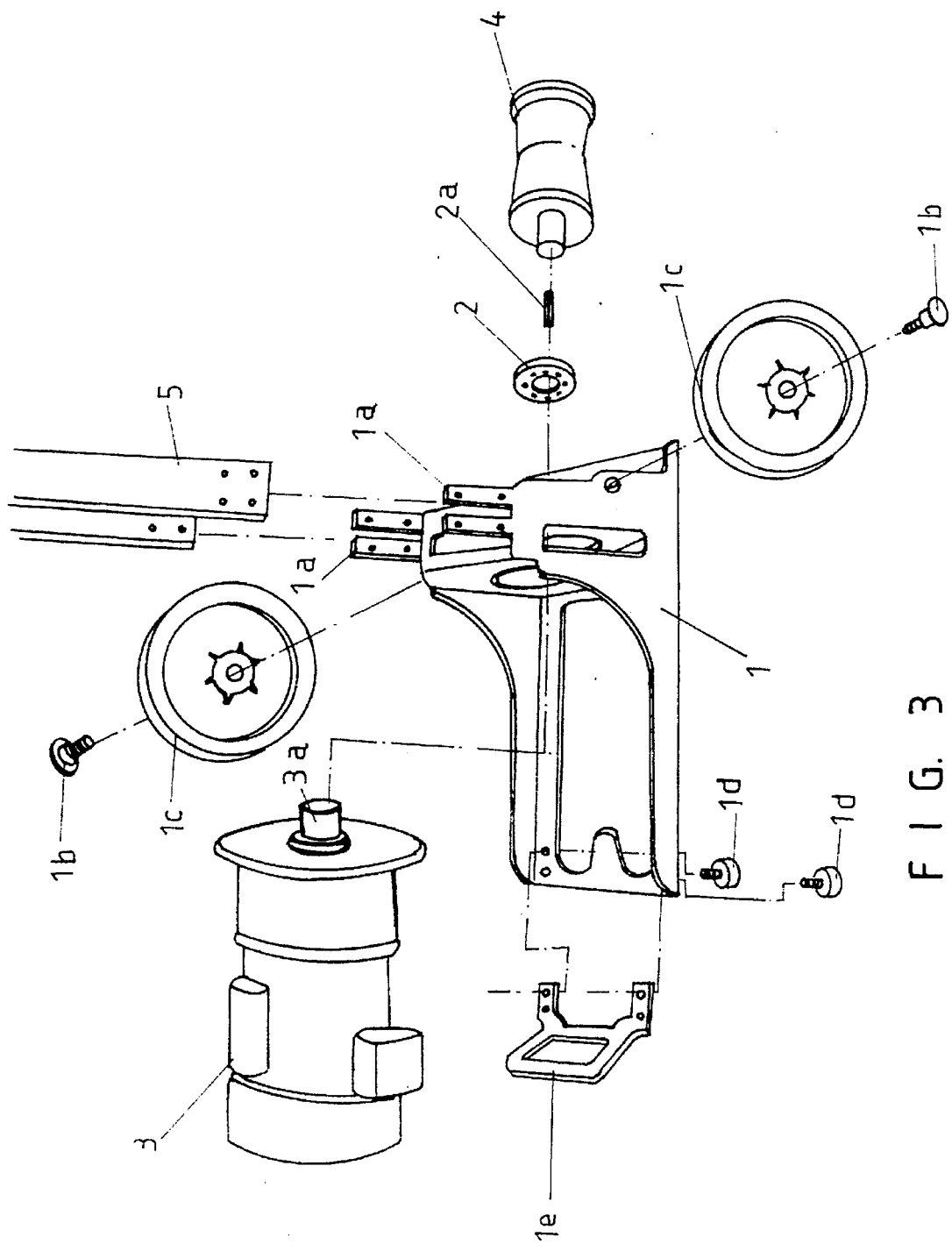
FIG. 3 is a perspective exploded view of a main body.

Referring to FIGS. 1 to 3, a foldable wire draw bench has a main body 1, a retarding motor 3 on the main body 1, a spool 4 disposed at the front end of the main body 1, the first section arm 5 disposed at the front upper portion of the main body 1, the second section arm 6 connecting the first section arm 5, the third section arm 7 connecting the second section arm 6, and a wire-leading position device 10 connecting the third section arm 7. The first non-push type positioning device 8 connects the first section arm 5 and the second section arm 6. The second non-push type positioning device 9 connects the second section arm 6 and the third section arm 7. A wire-leading position device 10 connects the distal end of the third section arm 7. Two legs 1d are disposed at the rear bottom end of the main body 1. A grip 1e is disposed at a rear end of the main body 1. Two parallel positioning fins 1a are disposed on the front upper portion of the main body 1 to position the first section arm 5. Two wheels 1c are fastened on the main body 1 by two bolts 1b. A positioning bearing 2 is disposed between the pivot 3a of the retarding motor 3 and the spool 4. The width of the first section arm 5 is larger than that of the second section arm 6. The width of the second section arm 6 is larger than that of the third section arm 7. Each non-push type positioning device 8 or 9 can adjust the angle between two arms 5 and 6 or 6 and 7 up to one hundred and eighty degrees.

Figure 4:
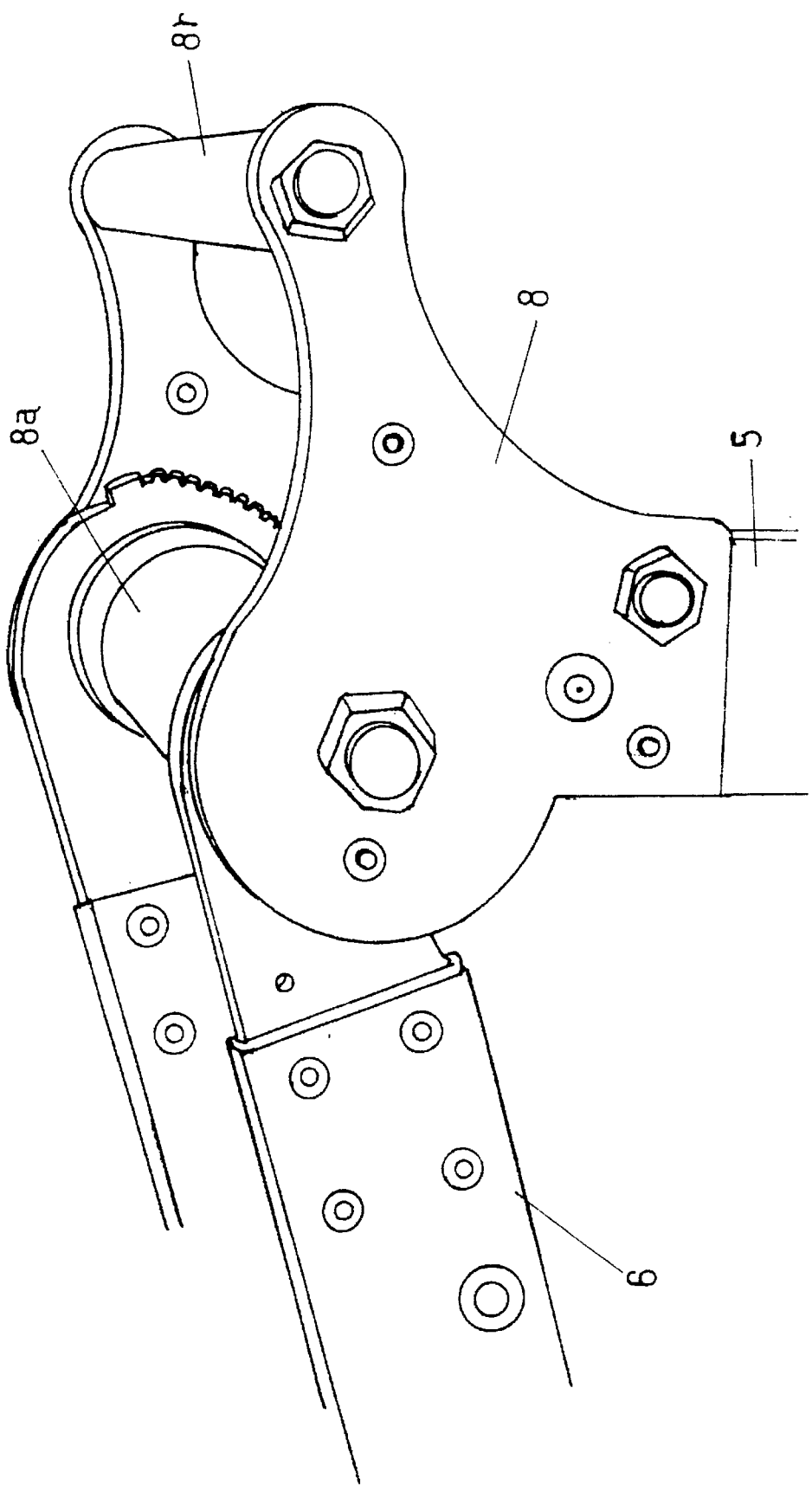
FIGS. 4 and 5 are perspective views illustrating the connection of the first section arm and the second section arm with the first non-push type positioning device.
Figure 5:
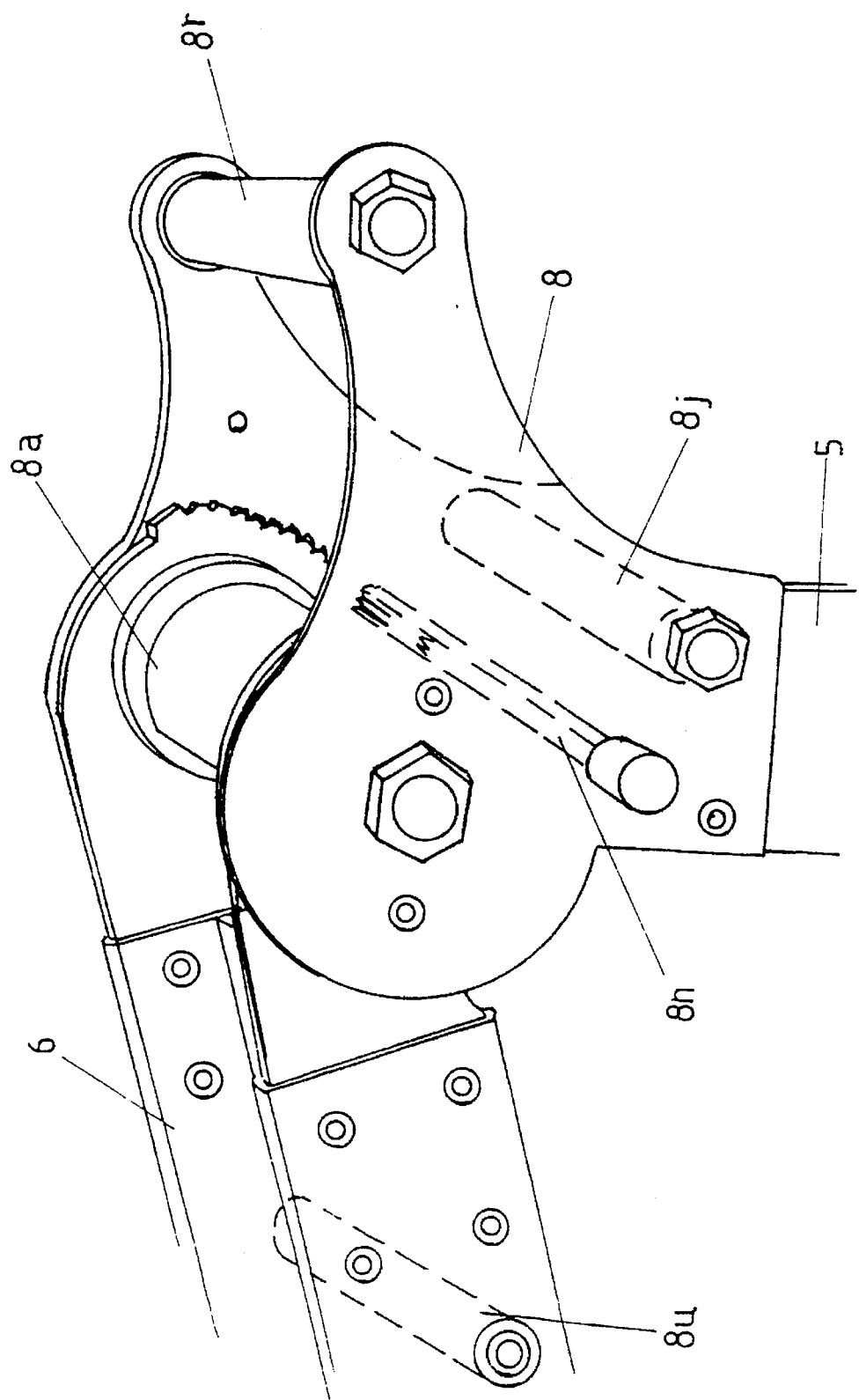
Figure 6:
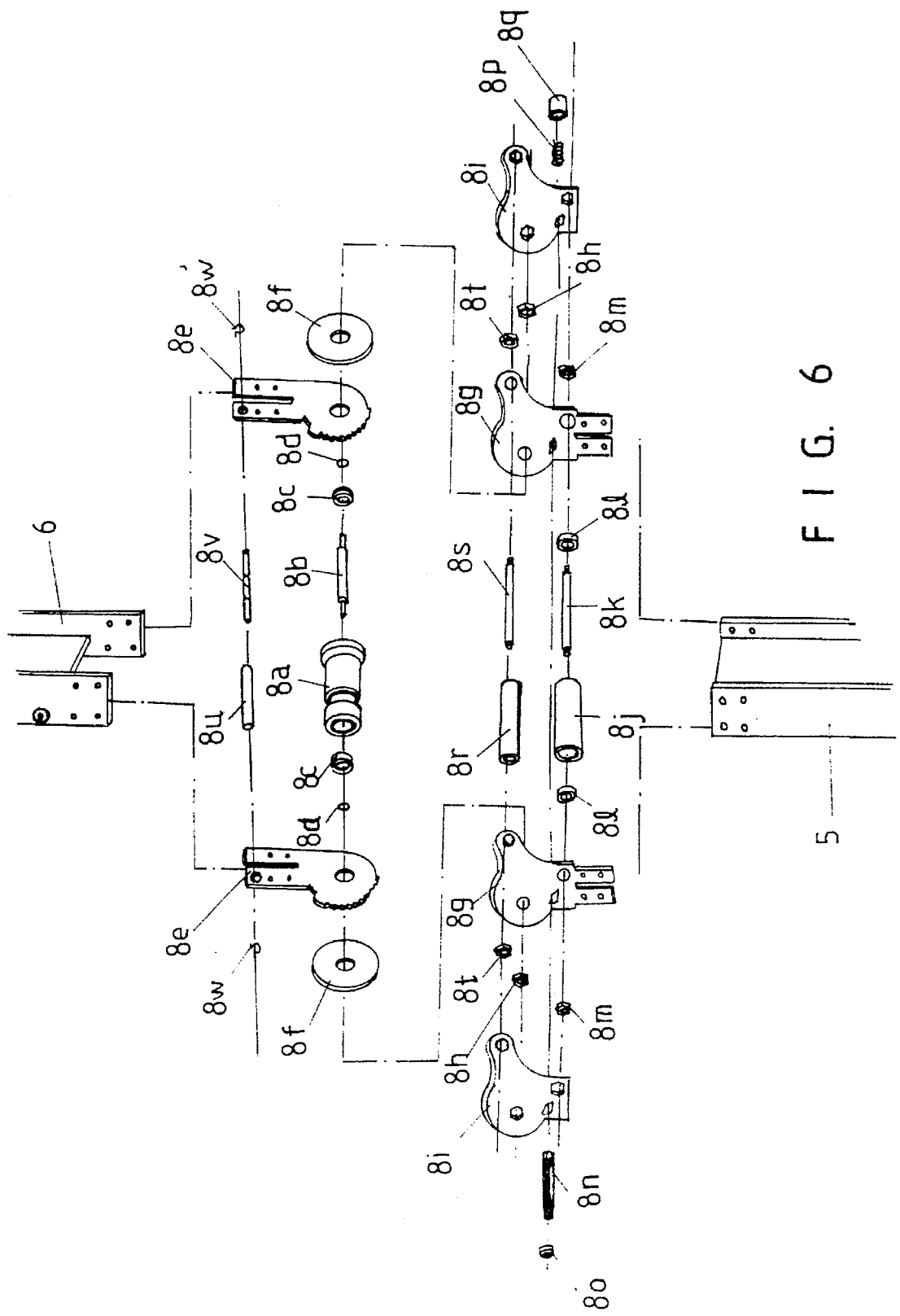
FIG. 6 is a perspective exploded view of the first non-push type positioning device.

Referring to FIGS. 4 to 6, the first non-push type positioning device 8 contains the first reel 8a, the first shaft 8b, a pair of the first bearings 8c, two pads 8d, two positioning toothed plates 8e, two slip-resistant packings 8f, two positioning plates 8g, a pair of the first nuts 8h, two nut-retaining plates 8i, the second reel 8j, the second shaft 8k, a pair of the second bearings 8l, a pair of the second nuts 8m, a positioning pin 8n, a positioning ring 8o, the first spring 8p, and the first spring cover 8q. Each end of the first shaft 8b passes through the first bearing 8c, a round pad 8d, a positioning toothed plate 8e, a slip-resistant packing 8f, a positioning plate 8g, and a nut 8h. A bar positioning shaft 8s is inserted in a handle bar 8r. Two opposite ends of the bar positioning shaft 8s are inserted in two positioning plates 8g and a pair of the third nuts 8t. The second shaft 8k is inserted in the second reel 8j. Two opposite ends of the second shaft 8k are inserted in a pair of the second bearings 8l, two positioning plates 8g, and a pair of the second nuts 8m. Two nut retaining plates 8i are adjacent to the corresponding positioning plates 8g. A positioning pin 8n which has two toothed ends passes through two nut-retaining plates 8i and two positioning plates 8g. A positioning ring 8o receives one end of the positioning pin 8n tightly. A spring cover 8q which has a spring 8p therein receives the opposite end of the positioning pin 8n tightly. The positioning toothed plates 8e connect the second section arm 6 pivotally. The positioning plates 8g connect the first section arm 5 pivotally. A third shaft 8v is inserted in a sleeve 8u. Two ends of the sleeve 8u pass through the positioning toothed plates 8e and are positioned by two U-shaped retaining rings 8w.

Figure 7:
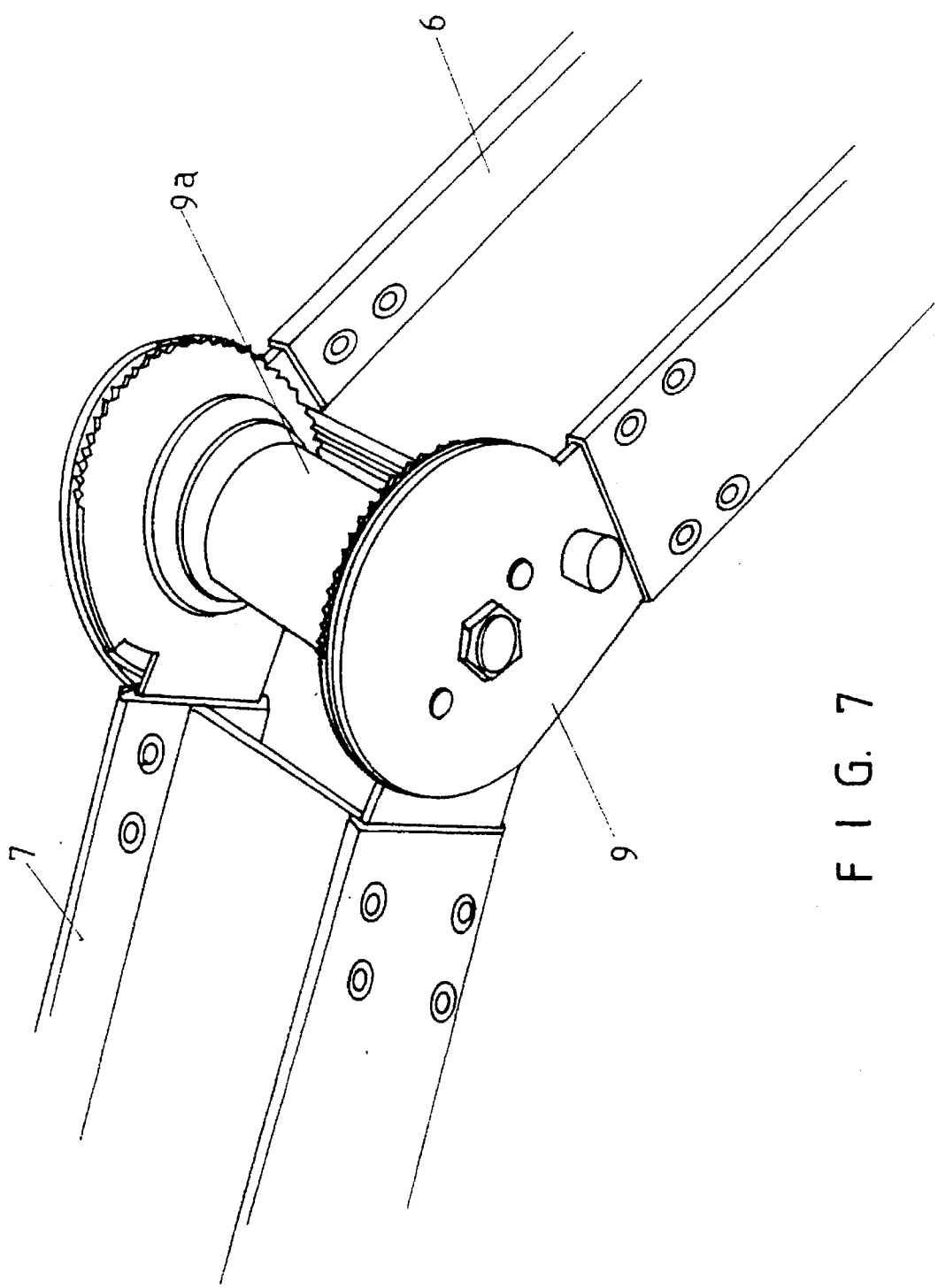
FIG. 7 is a perspective view illustrating the connection of the second section arm and the third section arm with the second non-push type positioning device.

Referring to FIGS. 7 and 8, the second non-push type positioning device 9 contains the fourth shaft 9b, the third reel 9a, two positioning toothed plates 9e, two slip-resistant packings 9f, two fixing plates 9g, two nuts 9h and two nut-retaining plates 9i. The fourth shaft 9b which has two threaded ends is disposed in the third reel 9a. Each end of the fourth shaft 9b passes through a round bearing 9c, a round pad 9d, a positioning toothed plate 9e, a slip-resistant packing 9f, a fixing plate 9g, and a nut 9h. A positioning pin 9j which has two toothed ends passes through two nut-retaining plates 9i and two fixing plates 9g. A positioning ring 9k receives one end of the positioning pin 9j tightly. A spring cover 9l which has a spring 9m therein receives the opposite end of the positioning pin 9j pivotally. The positioning toothed plates 9e connect the third section arm 7 pivotally. The fixing plates 9g connect the second section arm 6 pivotally.

Figure 9:
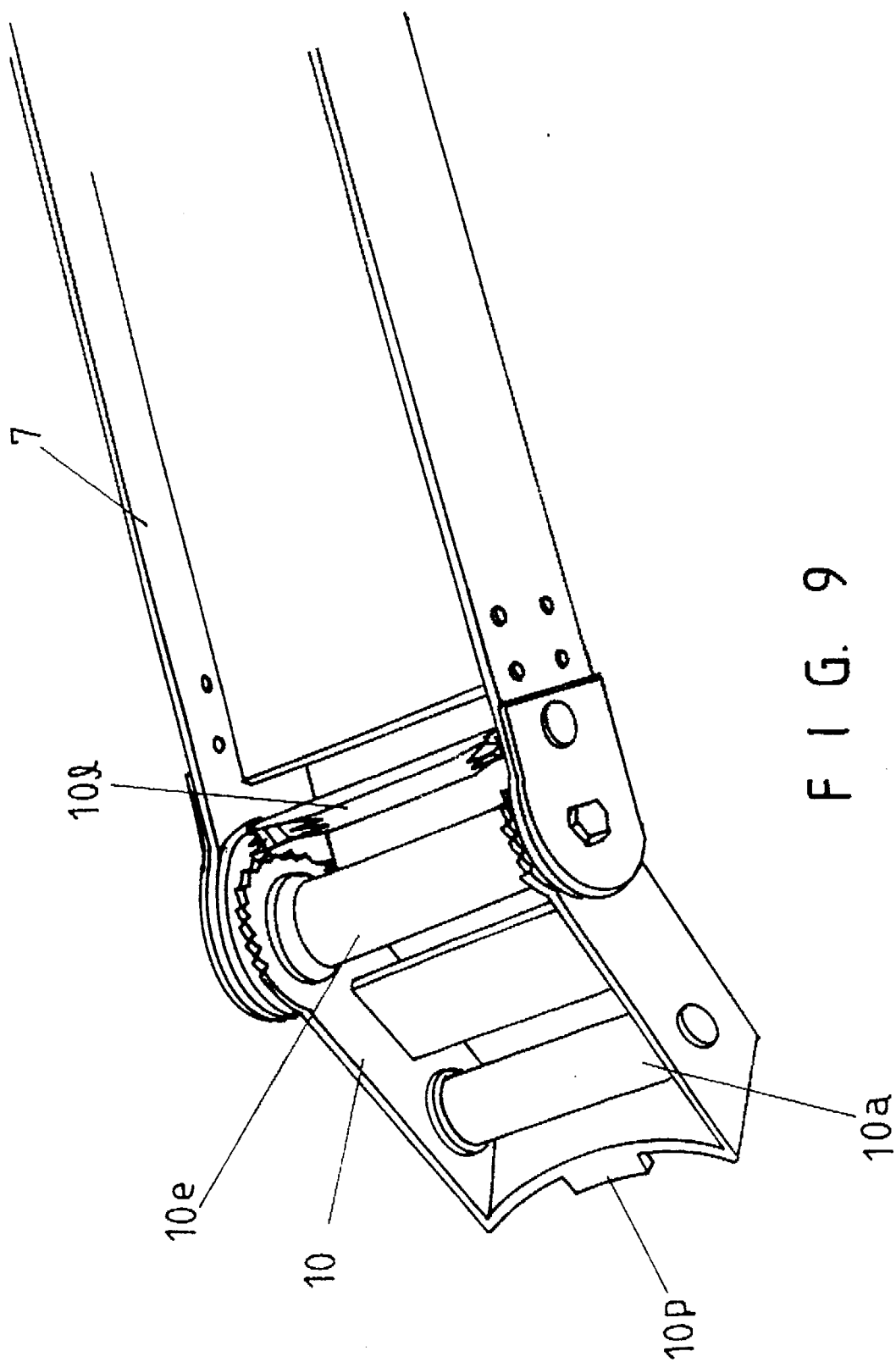
FIG. 9 is a perspective view illustrating the connection of the third section arm and the wire-leading position devices.
Figure 10:
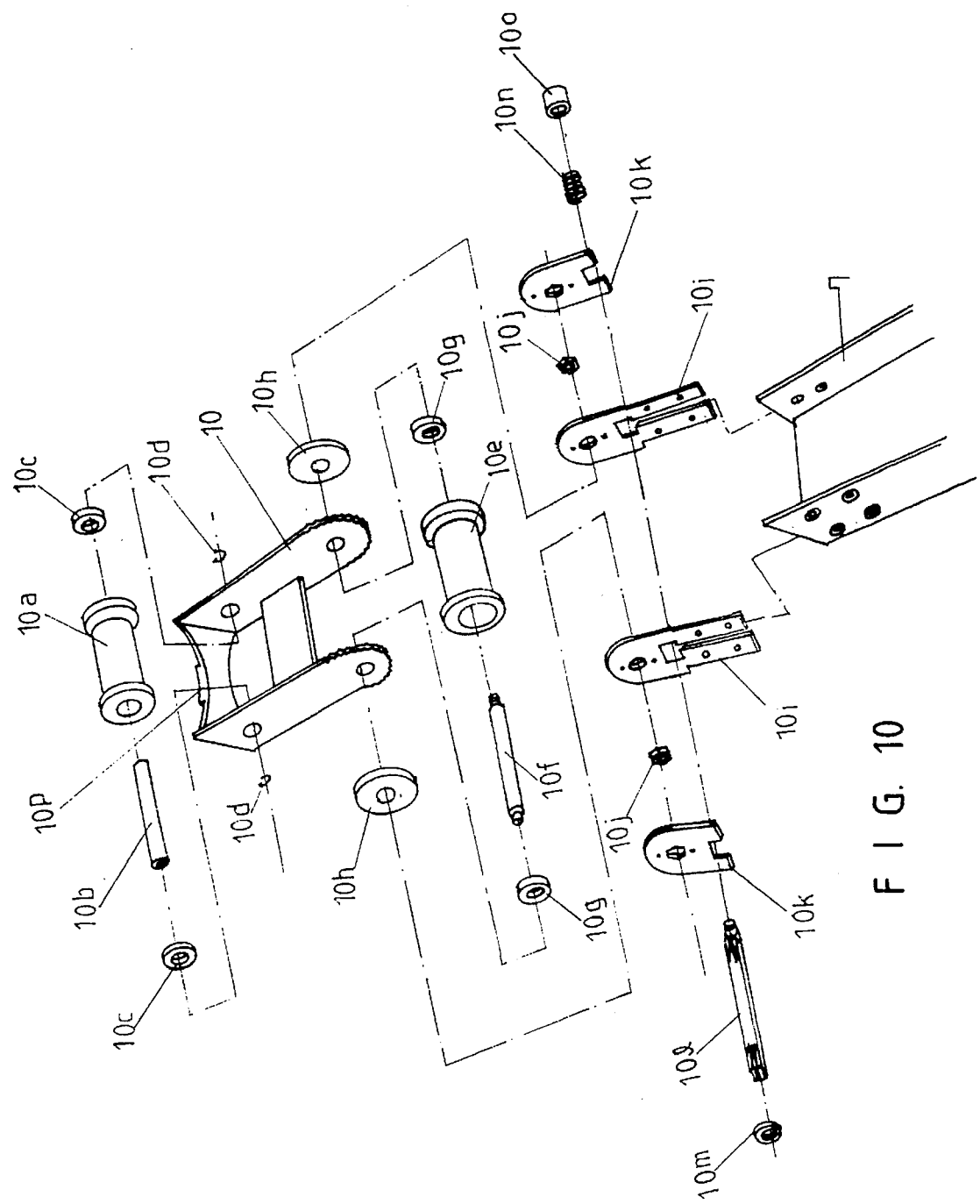
FIG. 10 is a perspective exploded view of the wire-leading position device.
Figure 11:
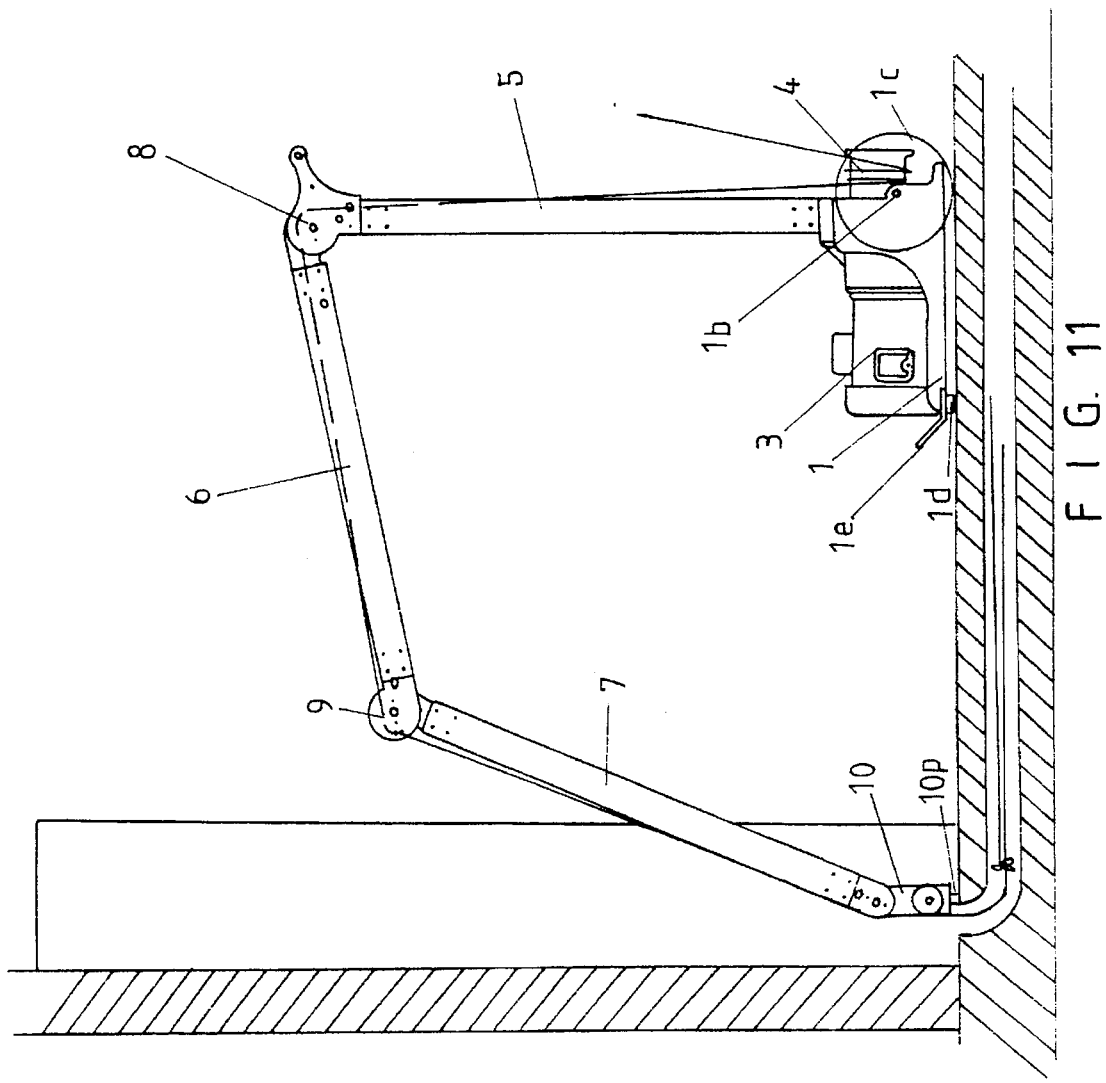
FIG. 11 is a schematic view illustrating the drawing of an underground pipe whose end is exposed upward with a foldable wire draw bench.
Figure 13:
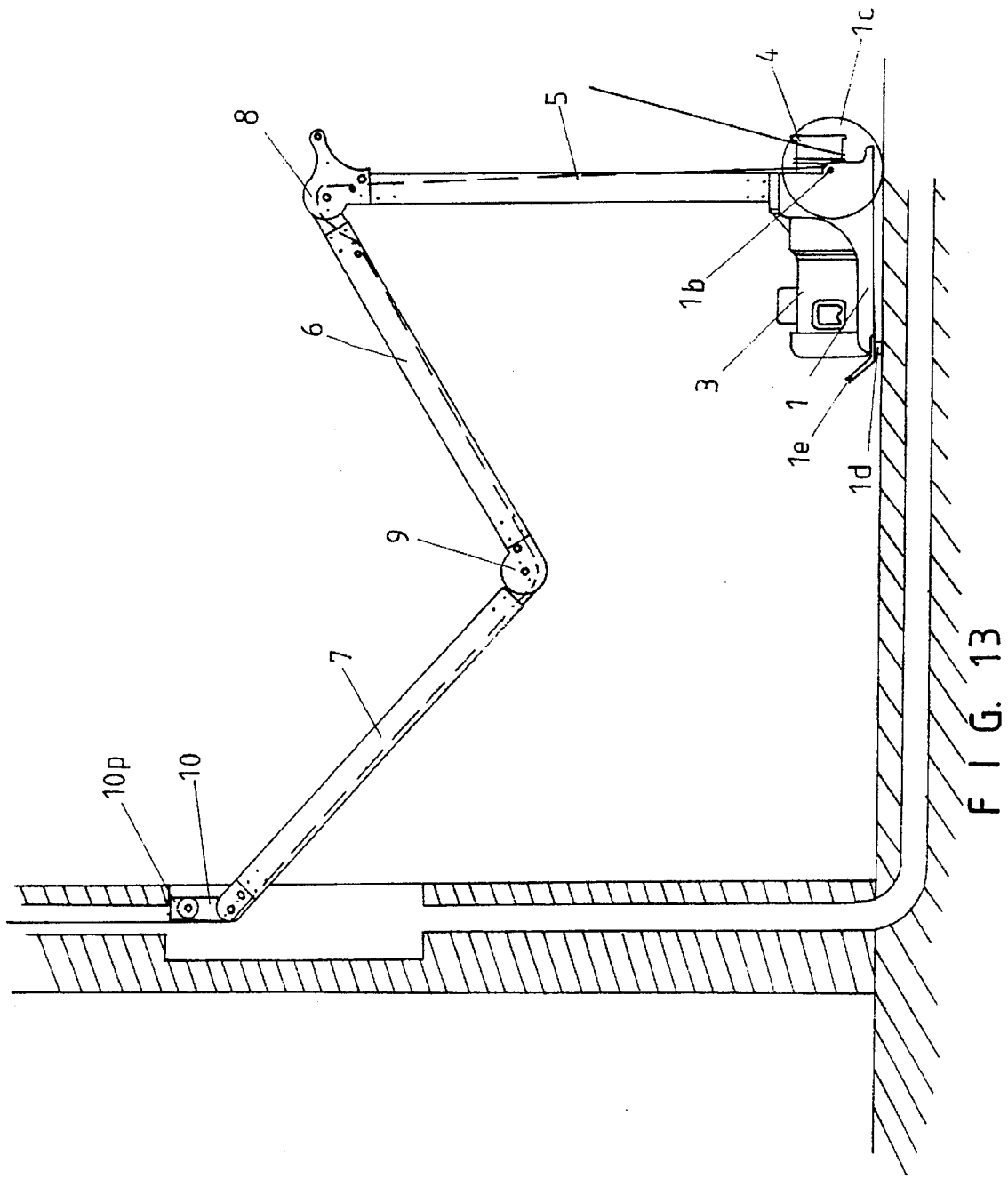
FIG. 13 is a schematic view illustrating the drawing of a pipe whose end is downward in a wall with a foldable wire draw bench.

Referring to FIGS. 9 and 10, the wire-leading position device 10 has a U-shaped plate 10p. The fifth shaft 10b is inserted in the fourth reel 10a. Two opposite ends of the fifth shaft 10b are inserted in a pair of the fourth bearings 10c and positioned by two retaining rings 10d. The fourth reel 10a is disposed between two arms of the U-shaped plate 10p. The sixth shaft 10f is inserted in the fifth reel 10e. Two opposite ends of the sixth shaft 10f are inserted in a pair of the fifth bearings 10g and positioned by two slip-resistant packings 10h and two grip nuts 10j. The fifth reel 10e is disposed between two arms of the U-shaped plate 10p. A settling pin 10l which has two toothed ends passes through two nut-retaining plates 10k and two settling plates 10i. A settling ring 10m receives one end of the settling pin 10l tightly. A spring cover 10o which has a spring 10n therein receives the opposite end of the settling pin 10l pivotally. The settling plates 10i connect the third section arm 7 pivotally.

FIGS. 11 to 14 illustrate the application of a foldable wire draw bench of the above-mentioned embodiment.

Figure 15:
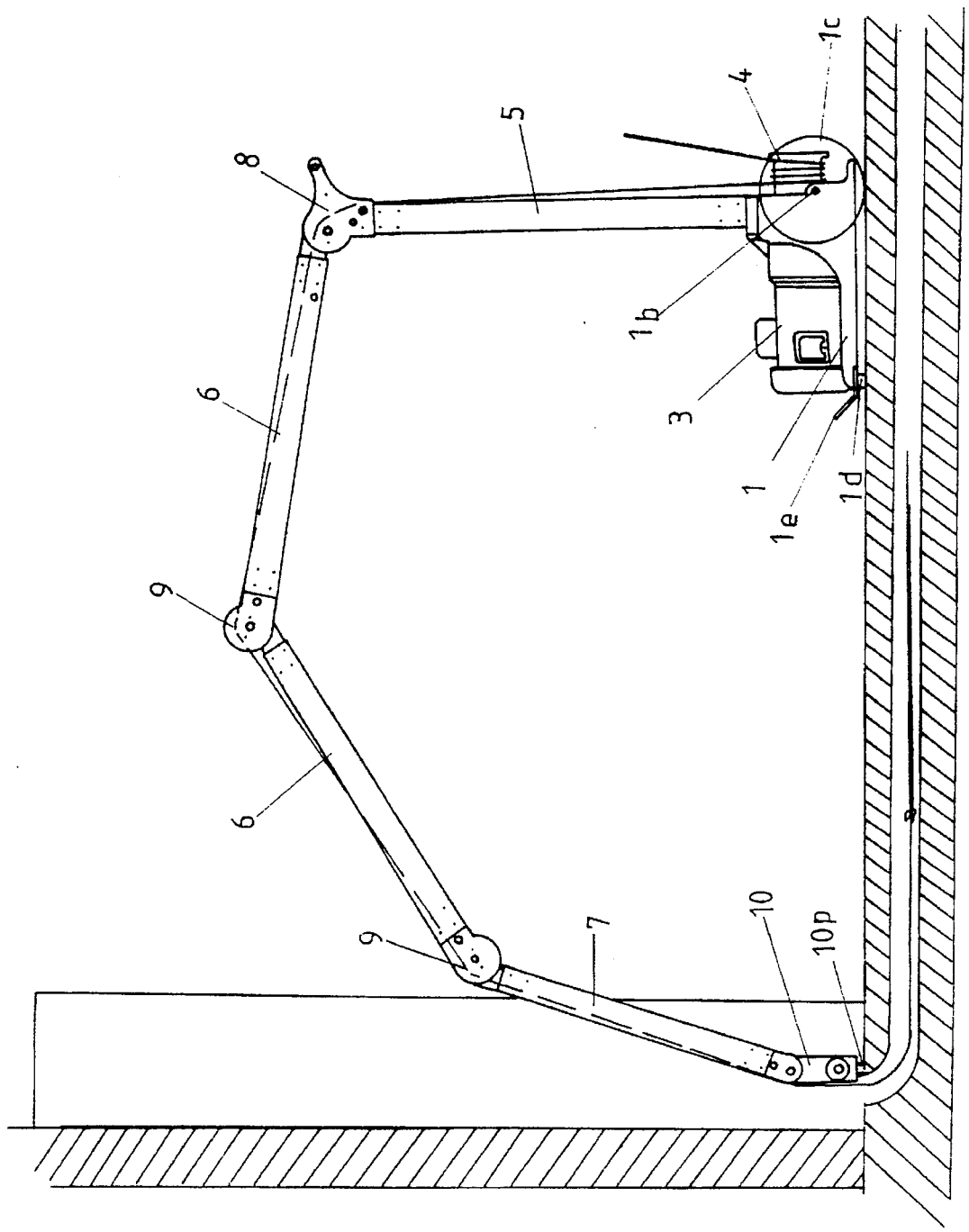
FIG. 15 is a schematic view illustrating the drawing of an underground pipe whose end is exposed upward with a foldable wire draw bench of a second embodiment.

FIG. 15 illustrates the application of another foldable wire draw bench with the first section arm 5, a couple of the second section arms 6, and the third section arm 7.

The advantages of the invention are described as follows. The wire draw bench can be stored vertically and removed easily. The addition of the handle plate, the legs and the main wheels can facilitate removing and positioning the wire draw bench. The non-push type direction adjusting and positioning device can adjust the angle between two section arms up to one hundred and eighty degrees.

The invention is not limited to the above embodiment but various modification thereof may be made. It will be understood by those skilled in the art that various changes in form and detail may be made without departing from the spirit and scope of the invention.

I claim:

1. A foldable wire draw bench comprising:

a main body 1;

a retarding motor 3 disposed on said main body 1;

a first section arm 5 disposed at a front upper portion of said main body 1;

a second section arm 6 and said first section arm 5 connected by a first positioning device 8;

a third section arm 7 and said second section arm 6 connected by a second positioning device 9;

a wire-leading position device 10 connecting a distal end of said third section arm 7;

a grip 1e disposed at a rear end of said main body 1, two parallel positioning fins 1a disposed on said front upper portion of said main body 1 to position said first section arm 5, two wheels 1c fastened on said main body 1, a positioning bearing 2 disposed between a pivot 3a of said retarding motor 3 and a spool 4, a width of said first section arm 5 larger than a width of said second section arm 6, and said width of said second section arm 6 larger than a width of said third section arm 7;

said first positioning device 8 containing a first reel 8a, a first shaft 8b, a pair of first bearings 8c, two pads 8d, two positioning toothed plates 8e, two slip-resistant packings 8f, two positioning plates 8g, a pair of first nuts 8h, two nut-retaining plates 8i, a second reel 8j, a second shaft 8k, a pair of second bearings 8l, a pair of second nuts 8m, a positioning pin 8n, a positioning ring 8o, a first spring 8p, and a first spring cover 8q;

each end of said first shaft 8b passing through a first bearings 8c, a pad 8d, a positioning toothed plate 8e, a slip-resistant packing 8f, a positioning plate 8g, and a nut 8h; a bar positioning shaft 8s inserted in a handle bar 8r; two opposite ends of said bar positioning shaft 8s each inserted in a respective one of said positioning plates 8g and one of a pair of third nuts 8t; said second shaft 8k being inserted in said second reel 8j; two opposite ends of said second shaft 8k each inserted in a respective one of said second bearings 8l, said positioning plates 8g, and said second nuts 8m; said nut-retaining plates 8i adjacent to said positioning plates 8g; said positioning pin 8n has two toothed ends each passing through a respective one of said nut-retaining plates 8i and a respective one of said positioning plates 8g; said positioning ring 8o receiving one end of said positioning pin 8n tightly; said first spring cover 8q having said first spring 8p therein receiving an opposite end of said positioning pin 8n tightly; said positioning toothed plates 8e connecting said second section arm 6 pivotally; said positioning plates 8g connecting said first section arm 5 pivotally;

a third shaft 8v inserted into a sleeve 8u; two ends of the sleeve 8u each passing through a respective one of the positioning toothed plates 8e and positioned by two U-shaped retaining rings 8w;

said second positioning device 9 containing a fourth shaft 9b, a third reel 9a, two second positioning toothed plates 9e, two second slip-resistant packings 9f, two fixing plates 9g, two fourth nuts 9h and two second nut-retaining plates 9i; said fourth shaft 9b having two threaded ends disposed in said third reel 9a; each end of said fourth shaft 9b passing through a round bearing 9c, a round pad 9d, a second positioning toothed plate 9e, a second slip-resistant packing 9f, a fixing plate 9g, and a fourth nut 9h; a second positioning pin 9j having which two toothed ends, each passing through one of said second nut-retaining plates 9i and one of said fixing plates 9g; a second positioning ring 9k receiving one end of said positioning pin 9j tightly; a second spring cover 9l which has a second spring 9m therein receiving an opposite end of said second positioning pin 9j pivotally;

said second positioning toothed plates 9e connecting said third section arm 7 pivotally; said fixing plates 9g connecting said second section arm 6 pivotally;

said wire-leading position device 10 having a U-shaped plate 10p; a fifth shaft 10b inserted in a fourth reel 10a;

two opposite ends of said fifth shaft 10b each inserted in one of a pair of fourth bearings 10c and positioned by two retaining rings 10d; said fourth reel 10a disposed between two arms of said U-shaped plate 10p; a sixth shaft 10f inserted in a fifth reel 10e; two opposite ends of said sixth shaft 10f each inserted in one of a pair of fifth bearings 10g and each positioned by a slip-resistant packing 10h; said fifth reel 10e disposed between said arms of said U-shaped plate 10p; a settling pin 10l which has two toothed ends each passing through one of nut-retaining plates 10k and one of two settling plates 10i; a settling ring 10m receiving one end of said settling pin 10l tightly; a third spring cover 10o which has a third spring 10n therein receiving an opposite end of said settling pin 10l pivotally; and said settling plates 10i connecting said third section arm 7 pivotally.

\* \* \* \* \*